United States Patent
Kim et al.

(10) Patent No.: US 6,596,814 B2
(45) Date of Patent: Jul. 22, 2003

(54) POLYPROPYLENE FILM HAVING GOOD DRAWABILITY IN A WIDE TEMPERATURE RANGE AND FILM PROPERTIES

(75) Inventors: Sehyun Kim, Murrysville, PA (US); Masaki Fujii, Glendale, CA (US)

(73) Assignee: Sunoco Inc. (R&M), Philadelphia, PA (US)

(*) Notice: Subject to any disclaimer, the term of this patent is extended or adjusted under 35 U.S.C. 154(b) by 0 days.

(21) Appl. No.: 09/996,642

(22) Filed: Nov. 28, 2001

(65) Prior Publication Data

US 2002/0137851 A1 Sep. 26, 2002

Related U.S. Application Data

(60) Provisional application No. 60/254,052, filed on Dec. 7, 2000.

(51) Int. Cl.⁷ .............................. C08F 8/00; C08L 23/00; C08L 23/04
(52) U.S. Cl. ....................... 525/191; 525/199; 525/222; 525/240
(58) Field of Search .................................. 525/191, 199, 525/222, 240

(56) References Cited

U.S. PATENT DOCUMENTS

| | | | | |
|---|---|---|---|---|
| 5,231,126 A | * | 7/1993 | Shi et al. |
| 5,491,188 A | * | 2/1996 | Ikeda et al. |
| 5,627,226 A | * | 5/1997 | Lustiger et al. |
| 5,681,922 A | * | 10/1997 | Wolfschwenger et al. |
| 6,110,588 A | * | 8/2000 | Perez et al. |

* cited by examiner

Primary Examiner—Nathan M. Nutter
(74) Attorney, Agent, or Firm—Robert A. Koons, Jr.; Karen C. Richardson; Buchanan Ingersoll PC

(57) ABSTRACT

The present invention provides polypropylene films and methods of making these films using high melt strength β-crystalline polypropylene. The films of the present invention are opaque, porous and have good physical properties, such as being capable of cold drawing to a thin gauge without breaking.

31 Claims, No Drawings

POLYPROPYLENE FILM HAVING GOOD DRAWABILITY IN A WIDE TEMPERATURE RANGE AND FILM PROPERTIES

The present application claims priority to Provisional Application No. 60/254,052, the content of which is hereby incorporated by reference in its entirety.

FIELD OF THE INVENTION

The present invention relates in general to the production of synthetic films and more specifically to polypropylene films made by cold drawing a high melt strength, high β-cystalline polypropylene. The resultant films are opaque, porous and have good physical properties.

BACKGROUND OF THE INVENTION

Opaque polypropylene film can generally be obtained by stretching polypropylene containing a filler or colorant such as talc, clay, calcium carbonate or $TiO_2$. It is known to those skilled in the art that β-crystalline polypropylene can be used to produce opaque films without adding any filler or colorant. Such films owe their opacity to the presence of numerous pores throughout the film matrix that are formed by stretching the film.

Opaque films from β-crystalline polypropylene can be prepared via "cold drawing". That is, drawing the material at a relatively low temperature, such as more than 40° C. below the melting temperature, e.g., <120° C., as opposed to about 20 to 25° C. below the melting temperature, e.g., 140° C. for normal drawing, at a stretch ratio of 2–10 times in two directions. The first direction being the machine direction and the second direction being the transverse direction. However, it is difficult to produce a film with uniform thickness throughout because of the localized stress differences in the drawing directions, especially if thin gauge films (<2 mil) are produced. As a result, the thickness of a film made from β-crystalline polypropylene has been limited to >2 mil and the porosity limited to 30–40%. Another drawback to using a low stretching temperature is that it may lead to relatively high stretching forces that cause web breakage and machine limitation.

Therefore, a need exists in the art for a polypropylene capable of cold drawing to a thin gauge film which overcomes the above-mentioned drawbacks. The present invention provides a β-polypropylene including a small amount of a very high molecular weight component. This β-polypropylene exhibits high melt strength and is useful in making thin gauge films with high opacity and porosity at low drawing temperatures.

SUMMARY OF THE INVENTION

The present invention provides a composition of a β-crystalline polypropylene with a K value of at least about 0.5 and a melt tension at 230° C. of at least 5 cN, and 0.01 wt % to 10 wt % of a high molecular weight polymer having a molecular weight of at least about 1,000,000.

The present invention further provides a film made from a composition comprising a β-crystalline polypropylene with a K value of at least about 0.5 and a melt tension at 230° C. of at least 5 cN, and 0.01 wt % to 10 wt % of a high molecular weight polymer having a molecular weight of at least about 1,000,000.

The present invention yet further provides a method of making a porous film, the method comprising, incorporating 0.01 wt % to 10 wt % of a high molecular weight polymer having a molecular weight of at least about 1,000,000 into a polypropylene, the polypropylene having a K value of at least about 0.5 and a melt tension of at least about 5 cN at 230° C., blending the polypropylene with a β-nucleating agent, and drawing the polypropylene at a temperature about 20° C. to about 50° C. below the melt temperature of β-crystals therein to a film having a thickness of about 0.1 to about 10 mil.

DETAILED DESCRIPTION OF THE INVENTION

As used herein, the term "polypropylene" generally includes homopolymers, copolymers of polypropylene, such as, for example, block, graft, impact, random and alternating copolymers, terpolymers, etc., and blends with other polymers, preferably polyolefins, such as high density polyethylene (HDPE), low density polyethylene (LDPE), linear low density polyethylene (LLDPE), poly-1-butene, ethylene-vinyl alcohol copolymer or ethylene-methylmethacrylate copolymer and modifications thereof. Comonomers useful in the present invention include ethylene, 1-butene, 1-hexene, and other alpha-olefins.

Isotactic polypropylene is capable of crystallizing in several crystal forms. The α, or monoclinic, form is the most prevalent one. The β, or hexagonal, form is occasionally found in commercially available polypropylene, usually at low levels. The relative proportion, defined as the K value, of the β form in a polypropylene specimen can be determined by X-ray diffraction and is expressed by the empirical expression:

$$K = \frac{H_\beta}{H_\beta + H_{110} + H_{040} + H_{130}}$$

wherein $H_{110}$, $H_{040}$ and $H_{130}$ are the heights of the three strong peaks (100), (040) (130) of the α form respectively and $H_\beta$ is the height of the strong β-peak (300). From the above expression, it will be apparent that in the absence of the β-form the K value will be zero. Alternatively the K value will be one if only the β-form is present.

The β crystalline content of the polypropylene used in the present invention should preferably be at least 50% (i.e., having a K value of 0.5 or more), more preferably at least 60% (K value of 0.6 or more) and most preferably at least 70% (K value of 0.7 or greater). Polypropylene with a high β content can be produced by any number of methods known in the art including, but not limited to, using the following β-nucleators: Q-dye (the gamma-crystalline form of a quinacridone colorant, Permanent Red E3B), described in U.S. Pat. No. 5,310,584 issued to Jacoby et al., and the amides, such as N,N'-dicyclohexane-2,6-naphthalene dicarboxamide, described in U.S. Pat. No. 5,491,188 assigned to the New Japan Company. In U.S. Pat. No. 5,231,126 Shi, et al describe β-nucleating agents that are particularly preferred for use in the present invention. The β-nucleating agents described by Shi et al are mixtures of organic dibasic acids with oxides, hydroxides or acid salts of Group II metals. Suitable dibasic acids include pimelic, suberic, azelaic, o-phthalic, iso-phthalic and terephthalic. Examples of suitable Group II metals are magnesium, calcium, strontium and barium.

"Drawing ratio" as used herein, also referred to as "stretching ratio", means the ratio of the area of the film after drawing versus the area of the film, or sheet, before drawing and can be expressed as:

$$\text{Drawing Ratio} = \frac{\text{Area}_{[\text{After Drawing}]}}{\text{Area}_{[\text{Before Drawing}]}}$$

This ratio can also be expressed in terms of the product of the ratio of the area in one drawing direction, such as the machine direction, before drawing, versus the area after drawing, times the ratio of the area in a second direction, such as the transverse direction, after drawing versus the area before drawing, and can be expressed as:

$$\text{Drawing Ratio} = \frac{(\text{Area}_{[\text{Before Drawing}]})}{(\text{Area}_{[\text{After Drawing}]})_{MD}} \times \frac{(\text{Area}_{[\text{After Drawing}]})}{(\text{Area}_{[\text{After Drawing}]})_{TD}}$$

wherein MD refers to the machine direction and TD refers to the transverse direction.

Stretching ratios for the films of the present invention are preferably 2 to 50, more preferably 3–45 and most preferably 4–35. The films of the present invention have a porosity of preferably 10% to 75%, more preferably 15% to 50% and most preferably 25% to 45%. The films of the present invention can be stretched, or drawn down, to 0.1 to 10 mil, preferably 0.2 to 5 mil, more preferably to 0.5 to 2 mil and most preferably to about 1 mil.

High melt strength (HMS) polypropylene has been commercially available since at least the early 1980's. "Melt strength" as used herein means the resistance of elongational flow of a polymer melt and is characterized either by melt tension, i.e., the tensile stress of molten specimen or by elongational viscosity. Extensibility, which measures melt strength and drawability of a polymer melt can be determined by using a Rheoten extensional viscometer, in which a melt strand is extruded through a capillary die and pulled down with increasing velocity by a pair of wheels. The force necessary to pull the melt strand is measured to the breaking point of the strand. This maximum force is called melt strength or melt tension and the drawdown velocity at the breaking point is a measure of melt drawability.

High melt strength polypropylene is known to have good melt tension and drawdown capability in the melt state. "High melt strength," as used herein is defined has a melt tension of at least 5 cN at 230° C. Such a high melt strength polypropylene can be produced by introducing high molecular weight polymer chains, by broadening the molecular weight distribution, by branching or crosslinking via any means and by blending the polypropylene with other polymers. The drawdown capability of high melt strength polypropylene should preferably be present even in a semi-melt state of polypropylene, i.e., 20–50° below the melting temperature of β-crystalline polypropylene. Using the high melt strength polypropylene of the present invention comprising at least 50% β-crystalline crystals, an opaque film <2 mil having a desirable film properties such as uniform film thickness, opacity and porosity of 30–70% with good strength can be obtained without mechanical difficulty.

In the present invention, polypropylene can contain about 0.01 wt % up to about 10 wt % of high molecular weight polymers including, but not limited to, polyethylene and acrylic-modified polytetrafluoroethylene. These polymers preferably are present in the polypropylene in more than 0.01% and less than or equal to 10 wt %, more preferably in more than 0.05% and less than or equal to 5 wt % and most preferably in more than 0.1% and less than or equal to 2 wt %, to provide good drawing characteristics.

Polyethylene having a molecular weight above 1,000,000 to about 5,000,000, is termed high molecular weight. Polyethylene having a molecular weight above 5,000,000 to about 10,000,000, termed ultra high molecular weight. Techniques useful for dispersing the high and ultra high molecular weight polymer include melt blending (mechanically mixing or extruding the polymers while in a liquid state), and in-reactor blending. While both methods are operable with the current invention, the in-reactor blending method demonstrates superior dispersion efficiency. Preferably high and ultra high molecular weight polyethylene can be dispersed into the polypropylene matrix by polymerizing ethylene to a very high molecular weight before the propylene is polymerized. U.S. Pat. No. 4,271,279 details methods of making such high molecular weight polyethylene and its entire contents are incorporated herein by reference. In Example 1, the high molecular weight polyethylene was prepared in the first stage polymerization followed by the second stage polymerization of propylene. This is a typical example of in-reactor blending using multi-stage polymerization.

Acrylic-modified polytetrafluoroethylene, with a molecular weight above 1,000,000 or even above about 5,000,000, can be dispersed by mechanically blending with polypropylene in the same extruder which is used for subsequent film extrusion. A surface-modified acrylic-modified polytetrafluoroethylene particularly preferred in the present invention is commercially available as METABLEN® A 3000, from Japan's Mitsubishi Rayon Company, Ltd.

The present invention will now be described for the purposes of illustration and not limitation by the following examples.

The results of Examples 1 through 3, and Comparative Example 4 are summarized in Table I.

EXAMPLE 1

Polypropylene with a melt flow rate of 2 and containing about 1 wt % polyethylene was prepared according to the general method disclosed in the example 1 of Japanese Laid Open Patent Application 2000-07 124. Briefly, an olefinic polymer composition comprising 1 part by weight of high molecular polyethylene and 99 parts by weight of polypropylene with ordinary intrinsic viscosity was prepared. The polyethylene portion of this composition was prepared by pre-activation of the polymerization catalyst system comprising transition metal compound, an organo-metallic compound and an electron donor. Propylene was then polymerized with the same catalyst so that 99 parts by weight of the total product is comprised of polypropylene. From this, a β-crystalline polypropylene having melt tension of 10 cN at 230° C. was prepared by extruding the polypropylene with 6,000 ppm of a 1:1 mixture of pimelic acid and calcium stearate, as described in the Shi patent, used as a β-nucleating agent. A cast film/sheet stock was produced on a chill roll at 100° C. to maximize the β-crystalline content. The resultant sheet stock having a β-crystallinity of at least 50% was stretched at 110° C. with a TM Long machine to yield a film with a thickness of 1±0.5 mil. The uniformity of the film was determined by measuring the thickness throughout the stretched film. If the thickness difference was less than 10%, the quality was considered to be excellent. If the thickness difference was higher than 10%, the quality was considered to be poor. The porosity of the film was estimated by the density difference measured before and after stretching.

EXAMPLE 2

To demonstrate the effectiveness of acrylic-modified polytetrafluoroethylene as the high molecular weight polymer in the present invention, polypropylene with a melt flow rate or; of 5 was blended with 5 wt % acrylic-modified polytetrafluoroethylene (METABLEN® A 3000) and 6,000 ppm of a 1:1 mixture of pimelic acid and calcium stearate as a β-nucleating agent. The β-crystalline polypropylene prepared this way had a melt flow rate of 3 and a melt tension of 6 cN at 230° C. Sheet stock and film were prepared as described in Example 1.

EXAMPLE 3

Polypropylene comprising 1 part by weight of high molecular polyethylene and 99 parts by weight of polypropylene with ordinary intrinsic viscosity and a melt flow rate of 5 was prepared as in Example 1. To this was added 10 wt % high density polyethylene (HDPE) having a molecular weight of about 500,000. The β-crystalline polypropylene prepared this way had a melt flow of 0.9 and a melt tension of higher than 8 cN at 230° C. Sheet stock and film were prepared as described in Example 1.

Comparative Example 4

Polypropylene with a melt flow rate of 2 was prepared in a similar manner to Example 1, except that the ethylene was not polymerized. From this, a β-crystalline polypropylene was prepared in the similar manner as in Example 1. The melt tension of the β-crystalline polypropylene prepared this way was 2 cN at 230° C. Sheet stock and film were prepared as described in example 1.

TABLE I

| | Example 1 | Example 2 | Example 3 | Comparative Example 4 |
|---|---|---|---|---|
| Property | | | | |
| Stretchability | Excellent | Excellent | Excellent | Poor |
| Thickness | <2 mil | <2 mil | <2 mil | >2 mil |
| Uniformity | Excellent | Excellent | Excellent | Poor |
| Opacity/mil | Better | Better | Much Better | Good |
| Porosity | 45% | 40% | 43% | 30% |
| Tensile/mil | Good | Good | Good | Good |

Films of the present invention may find use in a number of applications including, but not limited to the following: microfilters, breathable film for packaging, diapers, disposable clothing such as surgical gowns and synthetic paper. The films of the present invention may be particularly preferred for applications in which uniformity of thickness is critical such as battery separators and capacitor films.

The foregoing illustrations and examples of embodiments of the present invention are offered for the purposes of illustration and not limitation. It will be readily apparent to those skilled in the art that the embodiments described herein may be modified or revised in various ways without departing from the spirit and scope of the invention. The scope of the invention is to be measured by the appended claims.

We claim:

1. A composition comprising:
   a β-crystalline polypropylene with a K value of at least about 0.5 and a melt tension at 230° C. of at least 5 cN; and
   0.01 wt % to 10 wt % of an ultra-high molecular weight polyethylene or polytetrafluoroethylene.

2. The composition of claim 1, wherein said K value is at least about 0.6.

3. The composition of claim 2, wherein said K value is at least about 0.7.

4. The composition of claim 1, wherein said polypropylene comprises propylene homopolymer.

5. The composition of claim 1, wherein said polypropylene comprises impact copolymer.

6. The composition of claim 1, wherein said polypropylene comprises a random copolymer containing about 2.5% or less by weight of ethylene.

7. The composition of claim 1, wherein said polypropylene includes at least one of high density polyethylene (HDPE), low density polyethylene (LDPE), linear low density polyethylene (LLDPE), poly1-butene, ethylene-vinyl alcohol copolymer, ethylene-methylmethacrylate copolymer, ethylene, 1-butene and 1-hexene.

8. A film made from a composition comprising:
   a β-crystalline polypropylene with a K value of at least about 0.5 and a melt tension at 230° C. of at least 5 cN; and
   0.01 wt % to 10 wt % of an-ultra-high molecular weight polyethylene or polytetrafluoroethylene.

9. The film of claim 8, wherein said K value is at least about 0.6.

10. The film of claim 9, wherein said K value is at least about 0.7.

11. The film of claim 8, wherein said polypropylene comprises propylene homopolymer.

12. The film of claim 8, wherein said polypropylene comprises a random copolymer containing about 2.5% or less by weight of ethylene.

13. The film of claim 8, wherein said polypropylene comprises impact copolymer.

14. The film of claim 8, wherein said polypropylene includes at least one of high density polyethylene (HDPE), low density polyethylene (LDPE), linear low density polyethylene (LLDPE), poly1-butene, ethylene-vinyl alcohol copolymer, ethylene-methylmethacrylate copolymer, ethylene, 1-butene and 1-hexene.

15. A method of making porous film, said method comprising:
   incorporating 0.01 wt % to 10 wt % of an-ultra-high molecular weight polyethylene or polytetrafluoroethylene into a polypropylene, said
   polypropylene having a K value of at least about 0.5 and a melt tension of at least about 5 cN at 230° C.;
   blending said polypropylene with a beta-nucleating agent; and
   drawing said polypropylene at a temperature about 20° C. to about 50° C. below the melt temperature of β-crystals therein to a film having a thickness of about 0.1 to about 10 mil.

16. The method of claim 15, said thickness is about 0.2 to about 5 mil.

17. The method of claim 16, wherein said thickness is about 0.5 to about 2 mil.

18. The method of claim 17, wherein said thickness is about 1 mil.

19. The method of claim 15, wherein said film has a porosity of about 10% to about 75%.

20. The method of claim 19, wherein said film has a porosity of about 15% to about 50%.

21. The method of claim 20, wherein said film has a porosity of about 25% to about 45%.

22. The method of claim 15, wherein said K value is at least about 0.6.

23. The method of claim 22, said K value is at least about 0.7.

24. The method of claim 15, wherein said polypropylene comprises propylene homopolymer.

25. The method of claim 15, wherein said polypropylene comprises impact copolymer.

26. The method of claim 15, wherein said polypropylene includes at least one of high density polyethylene (HDPE), low density polyethylene (LDPE), linear low density polyethylene (LLDPE), poly35 1-butene, ethylene-vinyl alcohol copolymer, ethylene-methylmethacrylate copolymer, ethylene, 1-butene and 1-hexene.

27. The method of claim 15, wherein said drawing is accomplished by biaxial stretching.

28. The method of claim 15, wherein said drawing is accomplished by uniaxial stretching.

29. The method of claim 15, wherein said drawing is accomplished by blown film stretching.

30. The method of claim 15, wherein said drawing is at a drawing ratio of about 2 to about 50.

31. The method of claim 15, wherein said drawing is at a drawing ratio of about 4 to about 35.

* * * * *